United States Patent Office 2,938,544
Patented May 31, 1960

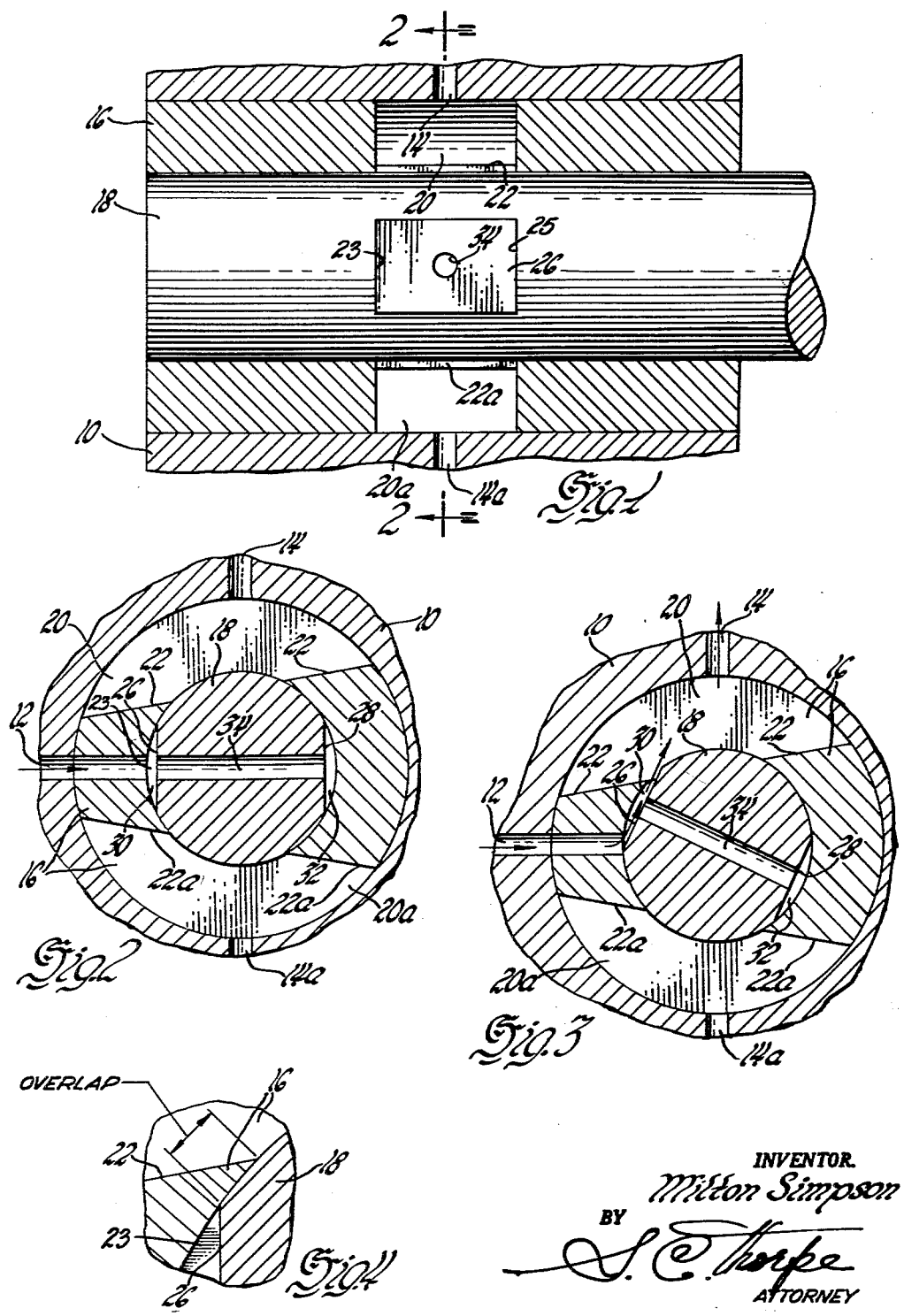

2,938,544
ROTARY VALVE

Milton Simpson, Royal Oak, Mich., assignor to General Motors Corporation, Detroit, Mich., a corporation of Delaware Filed Feb. 18, 1957, Ser. No. 640,712

5 Claims. (Cl. 137—625.47)

This invention relates to a rotary valve construction.

In co-pending application Serial No. 578,067, filed April 13, 1956 in the name of Robert Schilling, and which has since matured into Patent No. 2,902,104, there is described a pendulum-operated valve forming part of a system adapted to improve the handling characteristics of automotive vehicles. Such valve comprises a spool element which in operation is displaced in an axial direction.

A particular object of the present invention is to provide a rotary valve adapted for actuation through means, as a pendulum, sensitive to inertia disturbances of the type discussed in the identified application.

Another object is to provide a rotary valve which avoids difficulties of angular dimensional control in its manufacture.

Still another object is to provide a rotary valve adapted for the purpose indicated which is of extremely simple construction and which accordingly can be manufactured at low cost.

The invention will be specifically described with the aid of the accompanying drawings illustrating the same in a preferred embodiment. In the drawings Fig. 1 is a longitudinal section;

Fig. 2 is a transverse section;

Fig. 3 is a section similar to Fig. 2, but showing one of the parts in a different position; and Fig. 4 is an enlarged fragmentary detail in section.

As illustrated, the valve comprises a housing 10 including an inlet port 12 and outlet ports 14, 14a. Confined within the housing is a sleeve member 16 in turn confining a spool element 18.

Sleeve 16 has therein a pair of notches or grooves 20, 20a, the bottom of each notch being constituted of a pair of aligned flats 22, 22a spaced by the arc of a sector of the spool element. As shown, the two sets of flats stand in non-parallel relation.

Spool 18 also will be seen as comprising a pair of notches. One of these gives rise to a flat 26 and the walls 23 and 25, which, with the flat and the inner wall of the sleeve 16, provides a chamber 30. The other of the notches in the spool results in a flat 28 with walls corresponding to walls 23 and 25 and provides a second chamber 32 diametrically opposite chamber 30. Chamber 30 is open to the inlet 12 while chamber 32 is open to the chamber 30 via a radial bore 34 in the spool. With this arrangement, pressure in the chamber 32 when filled with fluid serves in the operation of the valve to balance the spool element, thereby to prevent localized wear.

The high degree of dimensional accuracy attainable according to the invention is believed well reflected by Fig. 4. In considering such a figure, it should be borne in mind that the desired predetermined overlap is obtained by the provision of two flat-bottomed notches, the simplest type of milling operation.

To describe now the operation of the valve, it should be obvious that either the spool or the sleeve 16, with the latter in fixed relation to the housing 10, can be readily adapted for operation by an inertia-sensitive mechanism. Normally, however, such mechanism is suitably connected to the spool component.

On clockwise rotation of the spool (Fig. 3), the inlet chamber 30, as the overlap is taken up, becomes open to the notch 20 which, with the inner wall of the housing, forms what may be termed an "outlet" chamber. Conversely, on counterclockwise rotation of the spool, the chamber 30 becomes open to the outlet chamber provided by the notch 20a.

Due to the out-of-parallel relation of the flats 22, 22a, the balancing provided by the fluid in the chamber 32 is maintained through all contemplated displacements of the spool.

The invention having thus been described and illustrated, what is claimed is:

1. A valve device comprising a housing including an inlet port and an outlet port, a sleeve member within said housing having a groove therein which with the inner wall of said housing provides an outlet chamber, a radially bored spool element within said sleeve having a first notch therein giving rise to a pair of walls which with the bottom of the notch and the inner wall of said sleeve member provide an inlet chamber and a second similar notch diametrically opposite said first notch serving in the manner of said first notch to provide a third chamber communicating with said second chamber through the radial bore in said spool element, fluid in said third chamber serving in operation of the valve to balance said spool element, said device being further characterized in operation in that on rotation of said spool element from a normal position said inlet and outlet chambers become open to each other.

2. A valve device comprising a housing including an inlet port and a pair of outlet ports, a sleeve member within said housing having a pair of grooves therein which with the inner wall of said housing provide a pair of outlet chambers, a radially bored spool element within said sleeve having a first notch therein giving rise to a pair of walls which with the bottom of the notch and the inner wall of said sleeve provide an inlet chamber and a second similar notch diametrically opposite said first notch serving in the manner of said first notch to provide a third chamber communicating with said second chamber through the radial bore in the spool element, fluid in said third chamber serving in operation of the valve to balance said spool element, said device being further characterized in operation in that on rotation of said spool element from a normal position said inlet chamber and one of said outlet chambers become open to each other.

3. A valve device according to claim 2 wherein the bottom of each of said grooves is constituted of a pair of aligned flats spaced by the arc of a sector of said spool element and wherein the two sets of flats are out of parallel.

4. A valve device comprising a housing including an inlet port and an outlet port, a sleeve member within said housing having a groove therein which with the inner wall of said housing provides an outlet chamber communicating with said outlet port, a spool element within said sleeve having a first notch mediate the ends thereof affording a pair of walls which with the bottom of the notch and the inner wall of said sleeve member provide an inlet chamber communicating with said inlet port and a second similar notch diametrically opposite said first notch serving in the manner of said first notch to provide a third chamber, and means providing a fluid passage between said inlet port and said third chamber, fluid entering said last-mentioned chamber from said passage serving in operation of the valve to balance said spool element, said device being further characterized in operation in that on rotation of said spool element from a normal position said inlet and outlet chambers become open to each other.

5. A valve device comprising a housing including an inlet port and a pair of outlet ports, a sleeve member within said housing having a pair of grooves therein coacting with the inner wall of said housing in the provision of a pair of outlet chambers communicating with said outlet ports, a spool element within said sleeve member having a first notch mediate the ends thereof affording a pair of walls which with the bottom of the notch and the inner wall of said sleeve member provide an inlet chamber communicating with said inlet port and a second similar notch diametrically opposite said first notch serving in the manner of said first notch to provide a fourth chamber, and means providing a fluid passage between said inlet port and said fourth chamber, fluid entering said last-mentioned chamber from said passage serving in operation of the valve to balance said spool element, said device being further characterized in that the bottoms of the grooves in said sleeve member are each constituted of a pair of aligned flats spaced by the arc of a sector of said inner member and in that the two sets of flats are out of parallel so that on rotation of said spool element to interconnect said inlet chamber and one of said outlet chambers fluid entrapped in said fourth chamber is not permitted to escape to the other outlet chamber.

References Cited in the file of this patent

UNITED STATES PATENTS

| | | |
|---|---|---|
| 1,529,529 | WoJahn | Mar. 10, 1925 |
| 1,638,152 | Gabriel | Aug. 9, 1927 |
| 2,204,106 | Reedy | June 11, 1940 |
| 2,476,702 | Colbath | July 19, 1949 |
| 2,613,906 | Weimar | Oct. 14, 1952 |